United States Patent
Cahill

(10) Patent No.: US 8,320,758 B2
(45) Date of Patent: Nov. 27, 2012

(54) CHANNEL MONITOR AND METHOD FOR ESTIMATING OPTICAL POWER

(75) Inventor: Michael Cahill, Dedham, MA (US)

(73) Assignee: Aegis Lightwave, Inc., Woburn, MA (US)

( * ) Notice: Subject to any disclaimer, the term of this patent is extended or adjusted under 35 U.S.C. 154(b) by 569 days.

(21) Appl. No.: 12/433,868

(22) Filed: Apr. 30, 2009

(65) Prior Publication Data

US 2009/0274457 A1   Nov. 5, 2009

Related U.S. Application Data

(60) Provisional application No. 61/049,759, filed on May 1, 2008.

(51) Int. Cl.
*H04B 10/08* (2006.01)

(52) U.S. Cl. .......... 398/38; 398/33; 398/34; 398/196; 398/197; 398/94; 398/95; 398/25; 398/26; 398/27; 398/85; 356/73.1; 356/519; 385/24; 385/11; 385/37

(58) Field of Classification Search ........... 398/33, 398/38, 25, 26, 27, 34, 79, 82, 83, 84, 85, 398/93, 94, 95, 158, 159, 162, 192, 194, 398/195, 196, 197, 201; 356/73.1, 519, 320, 356/521, 480; 385/24, 37, 14, 15, 11, 16
See application file for complete search history.

(56) References Cited

U.S. PATENT DOCUMENTS

| | | | |
|---|---|---|---|
| 7,002,697 B2 * | 2/2006 | Domash et al. | 356/519 |
| 7,130,505 B2 * | 10/2006 | Shen | 385/24 |
| 7,199,924 B1 * | 4/2007 | Brown et al. | 359/556 |
| 7,200,339 B1 * | 4/2007 | Roberts et al. | 398/159 |
| 7,385,754 B2 * | 6/2008 | Ghera et al. | 359/337.1 |
| 7,899,324 B2 * | 3/2011 | Anderson et al. | 398/25 |
| 2002/0131100 A1 * | 9/2002 | Myers et al. | 359/110 |
| 2004/0052525 A1 * | 3/2004 | Ovadia | 398/47 |
| 2004/0160596 A1 * | 8/2004 | He et al. | 356/73.1 |
| 2004/0208432 A1 * | 10/2004 | Mak et al. | 385/24 |
| 2004/0223769 A1 * | 11/2004 | Hoshida | 398/188 |
| 2005/0271386 A1 * | 12/2005 | Zeng et al. | 398/85 |
| 2005/0271394 A1 * | 12/2005 | Whiteaway et al. | 398/188 |
| 2006/0171716 A1 * | 8/2006 | Vasilyev et al. | 398/79 |
| 2007/0264010 A1 * | 11/2007 | Bartolini | 398/9 |
| 2010/0028012 A1 * | 2/2010 | Ng | 398/116 |
| 2010/0046944 A1 * | 2/2010 | Wagener et al. | 398/34 |
| 2011/0129216 A1 * | 6/2011 | Lin | 398/34 |

OTHER PUBLICATIONS

Peter Walsh, "Power Spectral Density Measurement Techniques", Paradyne, p. 3-4.*

* cited by examiner

*Primary Examiner* — Hanh Phan
(74) *Attorney, Agent, or Firm* — Kurt Rauschenbach; Rauschenbach Patent Law Group, LLP

(57) ABSTRACT

A method for estimating optical power in an optical channel includes determining a tunable filter full-width, $FW_F$, by measuring a response of the tunable filter to a known signal and mapping the response to frequency. A portion of an optical channel is coupled to an input of the tunable optical filter. A peak power response, $P_R$, and a full width tunable filter response, $FW_R$, to the optical channel are determined by measuring a response of the tunable filter to the optical channel and mapping the response to frequency. A signal power, $P_S$, is then calculated from the peak power response, $P_R$, and a ratio of the full width tunable filter response, $FW_R$, to the tunable filter full-width, $FW_F$.

20 Claims, 10 Drawing Sheets

Network Management System Requests
a Measurement of Optical Power
302

Determine Optical Filter Response Over
Optical Spectrum
304

Map Optical Filter Response to Frequency
306

Determine Peak Power Response of the Input Signal,
$P_R$, and Response Full Width, $FW_R$
308

Calculate Total Signal Power, $P_S$, with Predetermined
Power Factor
310

FIG. 3

CHANNEL MONITOR AND METHOD FOR ESTIMATING OPTICAL POWER

CROSS-REFERENCE TO RELATED APPLICATIONS

The present application is a non-provisional of U.S. Provisional Patent Application Ser. No. 61/049,759 filed on May 1, 2008. The entire contents U.S. Patent Application Ser. No. 61/049,759 is herein incorporated by reference.

BACKGROUND OF THE TEACHING

The section headings used herein are for organizational purposes only and should not be construed as limiting the subject matter described in the present application.

Optical fiber communication systems are now widely deployed. Recently, relatively new communication services, such as the Internet, high-speed data links, video services, wireless services and CATV, have resulted in a dramatic increase in the need for higher information data rates. The aggregate data throughput rate of a communication system can be increased either by increasing the bandwidth of an individual data channel or by increasing the number of data channels.

State-of-the art optical fiber communication systems are being built to transmit data over long distances with higher data rates and/or with a larger number of data channels. In addition, state-of-the art optical fiber communication systems often include features, such as gain management, wavelength multiplexing, tunability, and switching. Furthermore, state-of-the art optical communications systems are agile, flexible, and reconfigurable. Many features of these state-of-the art networks are automated.

These state-of-the art optical communications systems typically require monitoring throughout the system. Automation of many actions performed on these systems, such as channel provisioning and power balancing, can only be realized by the use of optical channel monitors (OCMs). Optical channel monitors provide information about the optical transmission system, such as the optical power, number of optical channels, channel identification, wavelength, and in some cases, optical signal-to-noise ratio (OSNR). It is desirable for the optical channel monitor to accurately determine the optical power in broadband optical signals.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

FIG. 3 is a flow chart illustrating the method of estimating optical power of a channel in a DWDM optical communications system.

DETAILED DESCRIPTION

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the apparatus and methods of the present teachings can include any number or all of the described embodiments as long as the teaching remains operable.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Some current state-of-the-art optical channel monitors have limited computing capacity. Therefore, a computationally intensive method of estimating the power of broadband signals is not desirable. The method of the present teaching can estimate the optical power of broadband signals with only a few relatively simple measurements and, therefore, is desirable for many applications.

Figure 1:
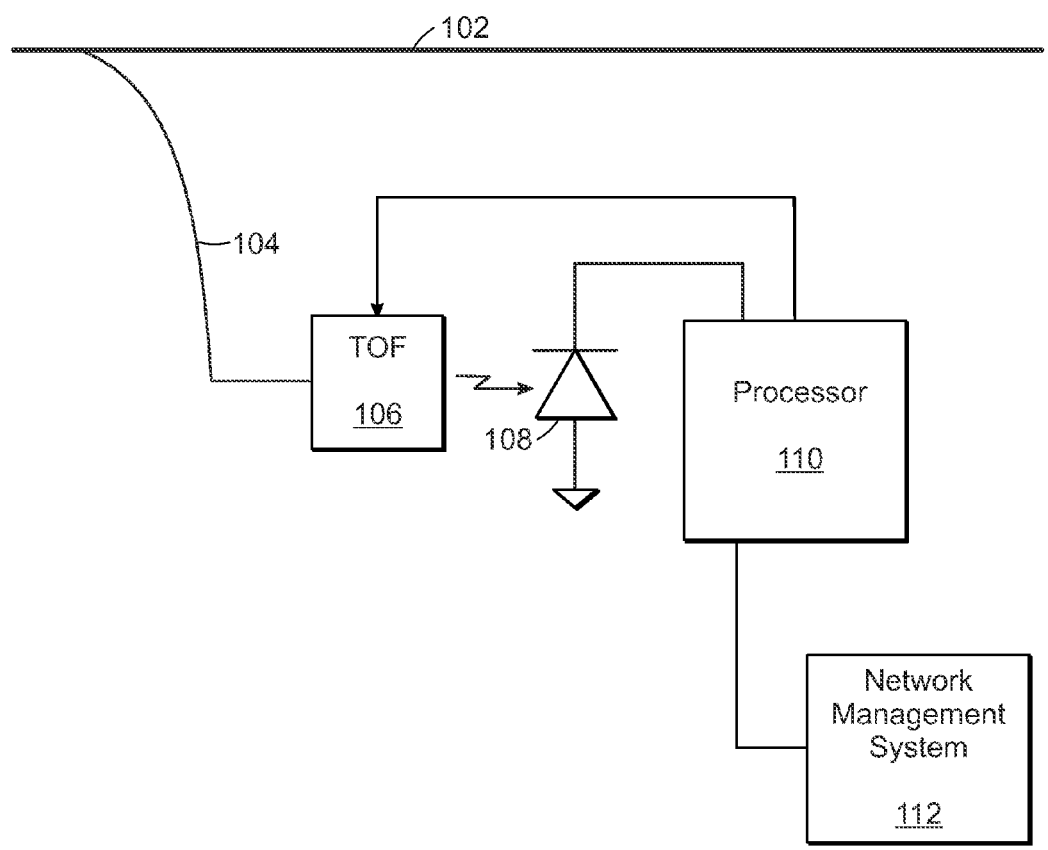
FIG. 1 illustrates a block diagram of an optical channel monitor that can estimate power of broadband optical signals according to the present teaching.

FIG. 1 illustrates a block diagram of an optical channel monitor 100 that can estimate power of broadband optical signals according to the present teaching. An optical channel 102 propagates broadband optical signals. An input of the optical tap 104 is optically coupled to the optical channel 102. The optical tap 104 directs a portion of the broadband optical signal propagating through the optical channel 102 to the optical channel monitor 100.

An output of the optical tap 104 is optically coupled to an input of a tunable optical filter 106. The tunable optical filter 106 can be any type of tunable optical filter that is electrically controllable. In one embodiment, the tunable optical filter 106 is an electrically controllable thermally tunable optical filter, such as the tunable optical filters that are commercially available from Aegis Lightwave, Inc., which is the assignee of the present application. One skilled in the art will appreciate that many other types of electrically tunable optical filters can be used. The tunable optical filter 106 selects an optical channel for monitoring and provides the selected optical channel to an output.

A detector 108 is positioned proximate to the output of the tunable optical filter 106 so that the selected optical channel is received at an input of the detector 108. In one embodiment, the detector 108 is a photodiode. The detector 108 generates a signal at an output that represents the selected optical channel.

The output of the detector 108 is electrically connected to a processor 110. In one embodiment, the processor 110 is a digital signal processor. The output of the processor 110 is electrically connected to a control input of the tunable optical filter 106. The processor 110 also includes a port that is electrically connected to a network management system 112. The processor 110 generates a control signal at the output according to the methods of the present teaching that controls the passband of the tunable optical filter 106. In addition, the processor 110 receives information from and provides data to the network management system 112.

In operation, a portion of a broadband DWDM optical signal is tapped from the optical channel 102 and directed to the input of the tunable optical filter 106. The tunable optical filter 106 selects an optical channel for monitoring and provides the selected optical channel to the output. The detector 108 receives the selected optical channel and generates a signal at the output which represents the selected optical channel.

The processor 110 receives the signal generated by the detector 108 and then estimates the optical power in the selected optical channel from the portion of the broadband DWDM optical signal tapped from the optical channel 102. In one embodiment, the processor 110 is a digital signal processor that performs a deconvolution of the peak powers of the selected optical channel signals received from the optical tap 104 with the known response function of the tunable optical filter 106. Assuming that the signal received from the optical tap 104 is a Gaussian signal and the tunable optical filter 106 response is a Gaussian filter response, then the response full-width-half-max, $FWHM_R$, is the sum of the signal full-width-half-max, $FWHM_S$, and the tunable optical filter full-width-half-max, $FWHM_F$, as shown below.

$$FWHM_R = FWHM_S + FWHM_F$$

The peak power response $P_R$ of the resulting filter response is proportional to the signal power, $P_S$, and the ratio of the filter full-width-half-max, $FWHM_F$, to the response full-width-half-max, $FWHM_R$, by the following equation:

$$P_R = P_S \frac{FWHM_F}{FWHM_R}.$$

For example, if the signal is a delta function, then the response FWHM is the response of the filter FWHM and the response peak power is the same as the signal power. If the signal has the same FWHM as the filter, then the response FWHM is twice that of the filter FWHM and the response peak power is half of the signal power. Thus, the signal power, $P_S$, can be estimated by using the following equation:

$$P_S = \frac{P_R \cdot FWHM_R}{FWHM_F}$$

where $P_R$ is the peak power response of the input signal through the tunable optical filter 106 recorded in real time.

A more general equation, applicable to arbitrary optical signals and measurements of the full-width (FW) at arbitrary values, such as optical signals measured 1, 2 or 3 dB down from the peak, can be expressed as:

$$P_S = \frac{P_R \cdot FW_R}{PF \cdot FW_F}$$

where PF is a variable referred to as the power factor, which relates the peak power response $P_R$ measurement to the full-width response, $FW_R$. The power factor, PF, typically has a value near 1.0 and can be predetermined through experiments under various conditions and stored in a look-up table memory device for use by the processor 110. The signal power, $P_S$, is thus a ratio of the peak power response to the power factor, PF, multiplied by the ratio of the response full-width, $FW_R$ to the filter full-width, $FW_F$.

Thus, the method of the present teaching can be used to estimate the power of most types of optical signals used in optical transmission systems with an optical filter by using the relatively simple calculations described herein. Furthermore, the methods of the present teaching do not require intimate knowledge of the input spectrum shape.

More specifically, the methods of the present teaching require only relatively simple measurements. In particular, the methods of the present teaching require filter characteristics, such as the filter full-width, $FW_F$, which are relatively easy to determined by well known calibration and testing methods using unmodulated signals. In addition, the methods of the present teaching require a measurement of the peak power response of the input signal, $P_R$, and a measurement of the response full-width, $FW_R$. These measurements of $P_R$ and $FW_R$ are relatively simple to perform in real time. Furthermore, the methods of the present teaching require a known value of the power factor, PF, which is a variable that relates the peak power response measurement to the response full-width, $FW_R$. The power factor, PF, can be determined by simple experiments and then stored in a look-up table memory device.

The power factor, PF, which can be expressed as the product of the power ratio, $P_R/P_S$ and the full-width ratio $FW_R/FW_F$, would be a constant if the input signal spectrum and the filter response were perfect Gaussian functions. However, both the input signal spectrum and the filter response are never perfect Gaussian functions in real systems. For a Gaussian input signal spectrum and a Lorentzian filter response, the power factor, PF, is a scaling factor that depends upon the full-width-half-max ratio $FW_R/FW_F$.

Figure 2A:
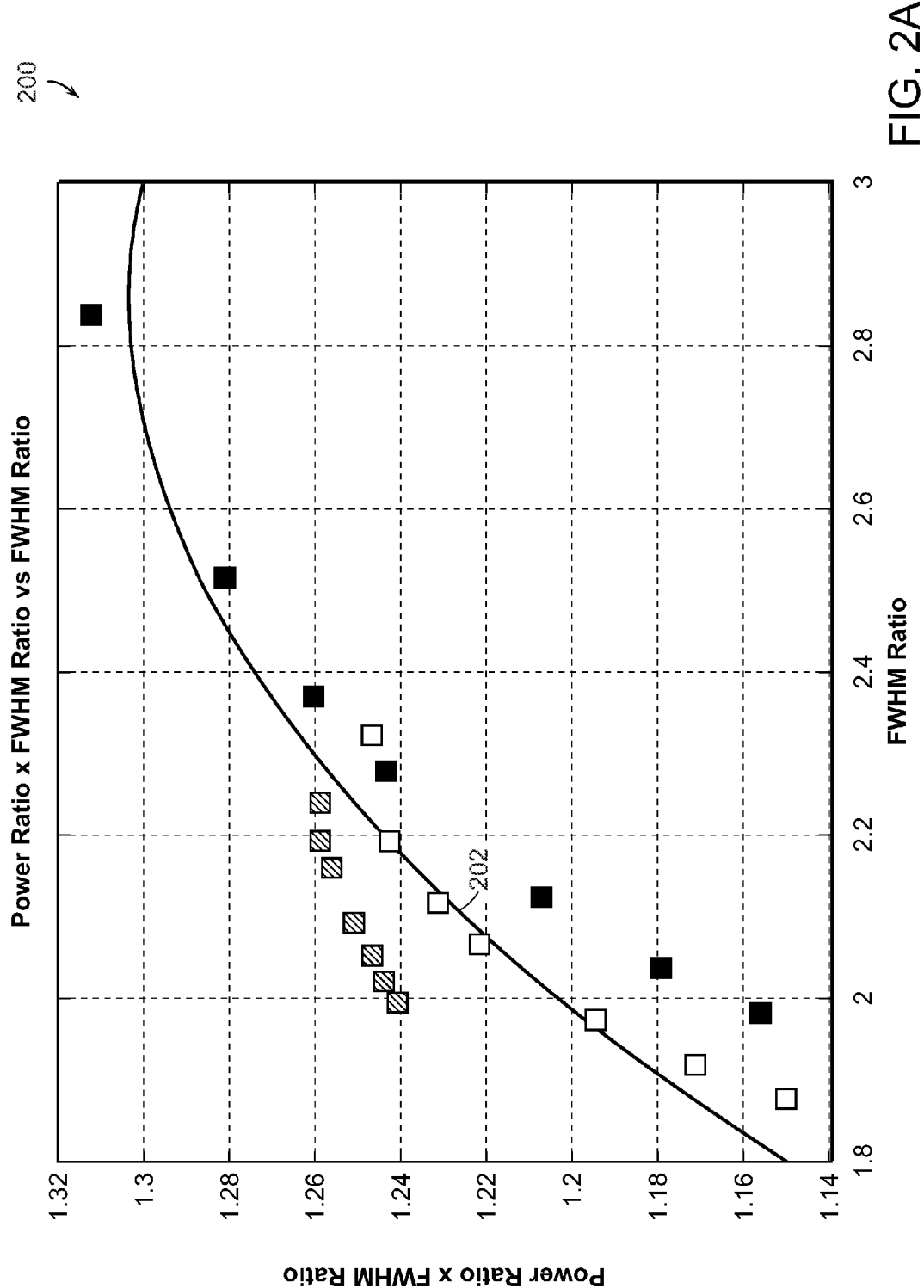
FIG. 2A illustrates experimental data for power estimation accuracy using the methods and apparatus of the present teaching.

FIG. 2A illustrates experimental data 200 for power estimation accuracy of a 40 Gbps signal using the methods and apparatus of the present teaching. FIG. 2A is a plot of the power factor (i.e. the product of the power ratio, $P_R/P_S$, and the full-width-half-max ratio, $FWHM_R/FWHM_F$) as a function of the full-width-half-max ratio, $FWHM_R/FWHM_F$. FIG. 2A shows a second order polynomial 202 that is fit to the experimental data 200. The experimental data 200 assumes an accurate measurement of the peak power response of the input signal, $P_R$, and also an accurate measurement of the response full-width, $FW_R$, and the filter full-width, $FW_F$.

Figure 2B:
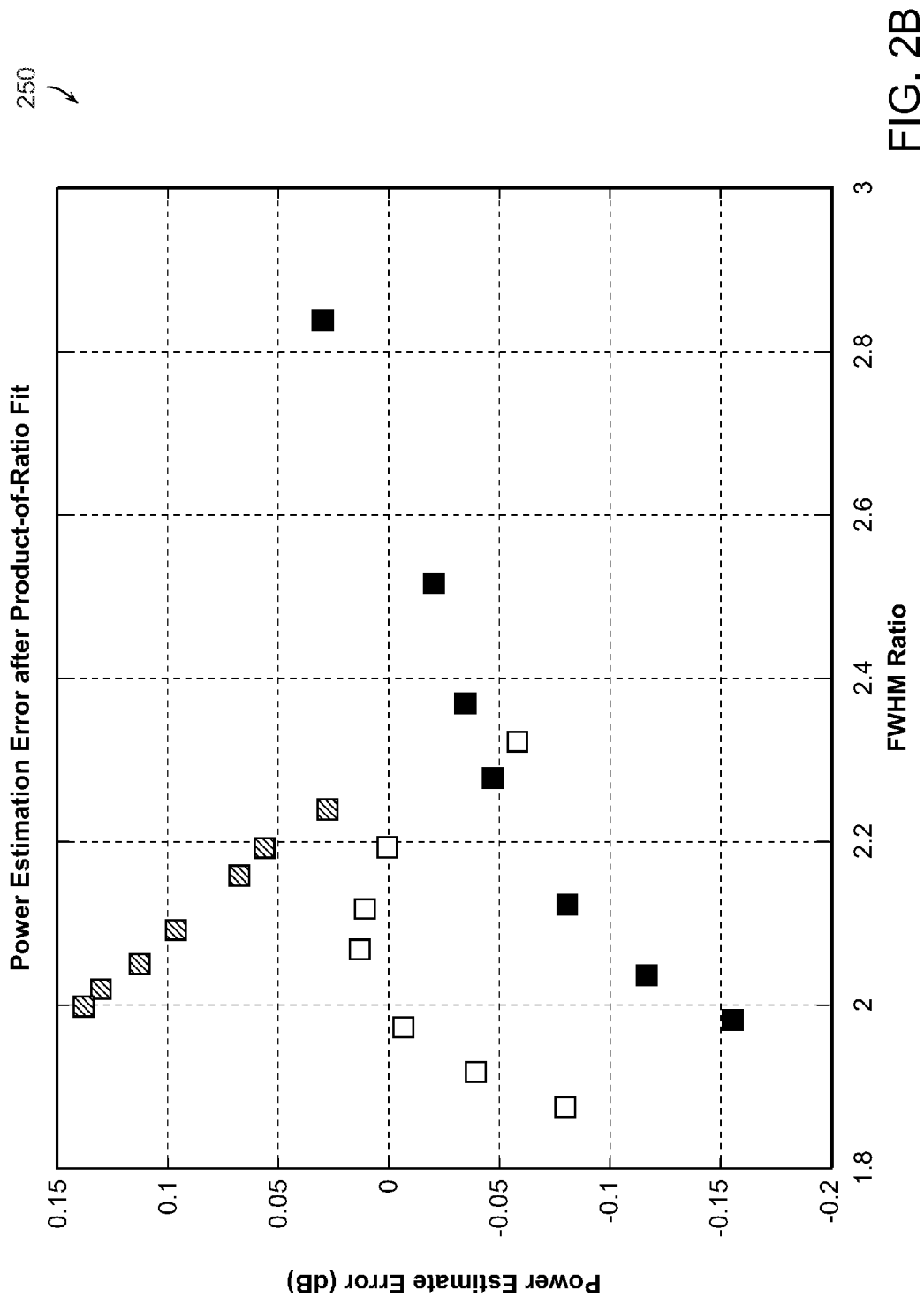
FIG. 2B illustrates calculated data for the power estimate error of a 40 Gbps signal, $P_{S,\ ERROR}$.

FIG. 2B illustrates calculated data 250 for the power estimate error of a 40 Gbps signal, $P_{S,\ ERROR}$. The power estimate error can be expressed by the following equation:

$$P_{S,ERROR} = db\left(\frac{PF_{ACTUAL}}{PF_{FIT}}\right)$$

where $PF_{ACTUAL}$ is the actual power factor and $PF_{FIT}$ is the power factor determined by fitting the experimental data 200. The calculated data 250 for the power estimate error, $P_{S,\ ERROR}$, indicates that the fundamental accuracy of the measurement can approach ±0.15 dB.

Thus, the methods and apparatus of the present teaching can be used to accurately estimate the power of broadband signals that are not captured within the bandwidth of the optical filter. Algorithms used in known optical channel monitors assume that all the signal power is captured within the bandwidth of the filter. However, current broadband optical signals, such as 40 Gbps bandwidth rate signals, are not captured within the bandwidth of commercially tunable optical filters. Furthermore, the computing capacity of known optical channel monitors is limited so computationally simple algorithms, such as the algorithms described herein are necessary. The methods and apparatus of the present teaching, therefore, provide an inexpensive way of accurately estimating the power of broadband signals with commercially available components that requires only a few simple measurements along with readily available calibration data.

FIG. 3 is a flow chart 300 illustrating the method of estimating optical power in a DWDM optical communications system. Referring to the optical channel monitor 100 described in connection with FIG. 1 and the flow chart 300, in a first step 302, the network management system 112 requests a measurement of the optical power. A signal is then sent to the processor 110 to initiate the measurement.

In a second step 304, the filter response is determined over the optical spectrum. The processor 110 generates a signal that instructs the tunable optical filter 106 to scan over the full DWDM optical spectrum. The optical power transmitted through the tunable optical filter 106 is then measured as a function of time to determine the optical filter response.

In a third step 306, the optical filter response determined in the second step 304 is mapped to frequency. This step uses calibration information that relates the signal that drives the tunable optical filter to the filter's centre optical frequency. In a fourth step 308, the peak power response of the input signal, $P_R$, and the response full-width, $FW_R$, is determined from the optical filter response that was mapped to frequency in the second step 304. In some embodiments, the peak power response of the input signal, $P_R$, and the response full-width, $FW_R$, are determined for each optical channel.

In the fifth step 310, the signal power, $P_S$, is calculated using a predetermined power factor with the following equation:

$$P_S = \frac{P_R \cdot FW_R}{PF \cdot FW_F}.$$

In some embodiments, the signal power, $P_S$, is calculated for each optical channel. The channels are then deconvolved from each other using the previously calculated $P_S$ values.

Figure 4:
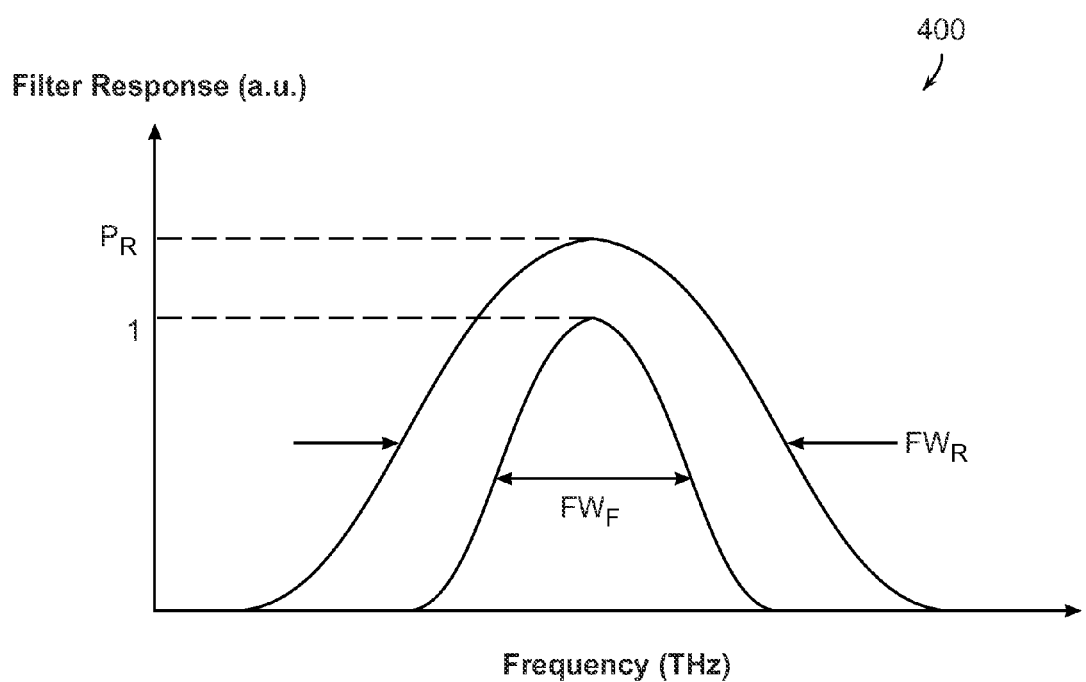
FIG. 4 is a theoretical plot of the normalized calibrated full-width filter response and the full-width response of the filter with a 40 Gbps signal present at the input as a function of frequency.

FIG. 4 is a theoretical plot 400 of the normalized calibrated full-width filter response and the full-width response of the filter with a 40 Gbps signal present at the input as a function of frequency. The plot 400 shows the peak power response, $P_R$, of the input signal through the tunable optical filter 106 (FIG. 1) recorded in real time. In addition, the plot 400 shows the full-width of filter ($FW_F$) and full-width of measurement response ($FW_R$).

Figure 5A:
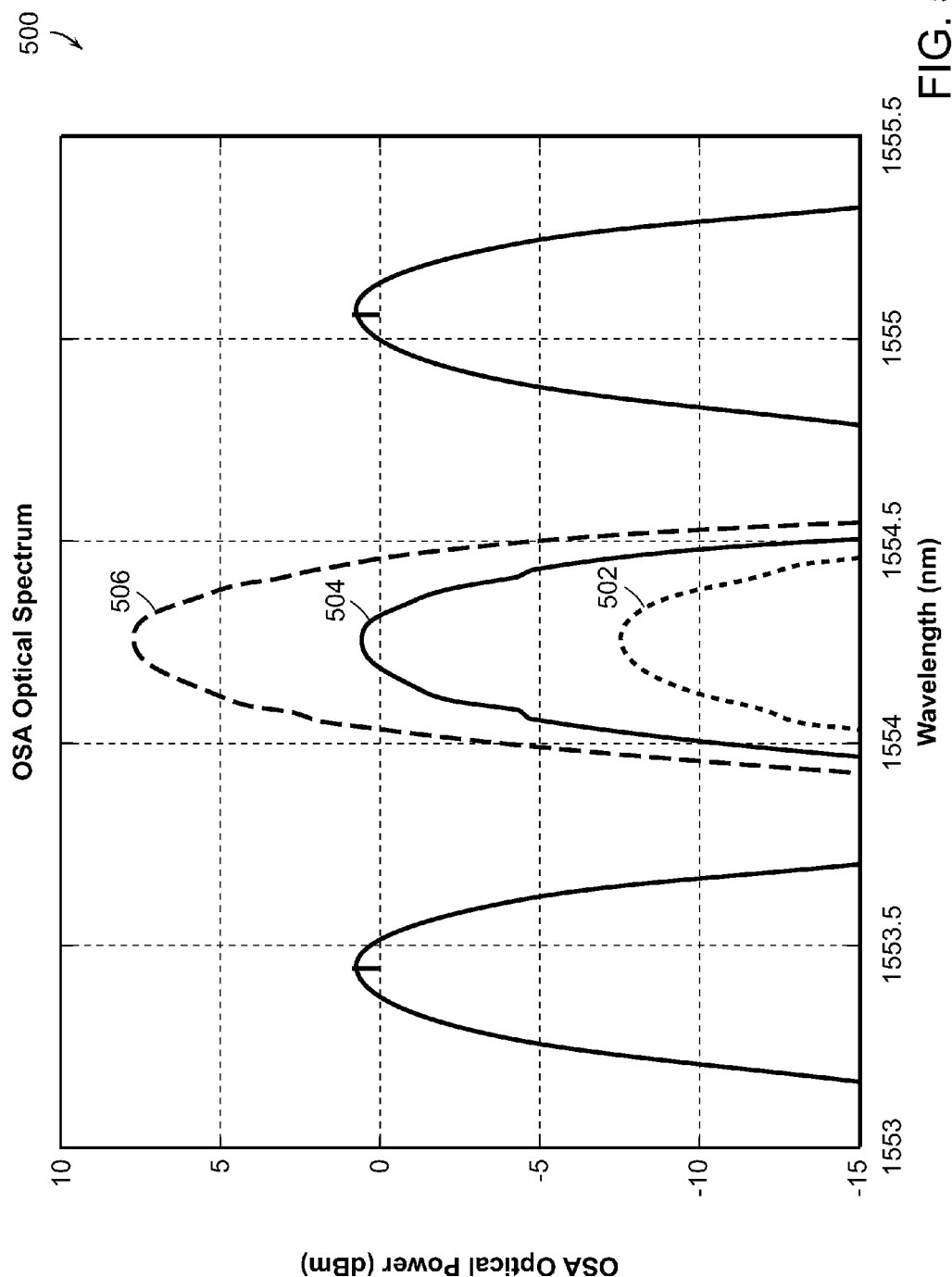
FIG. 5A illustrates a WDM input spectrum that is used for power detuning during power accuracy measurements.
Figure 5B:
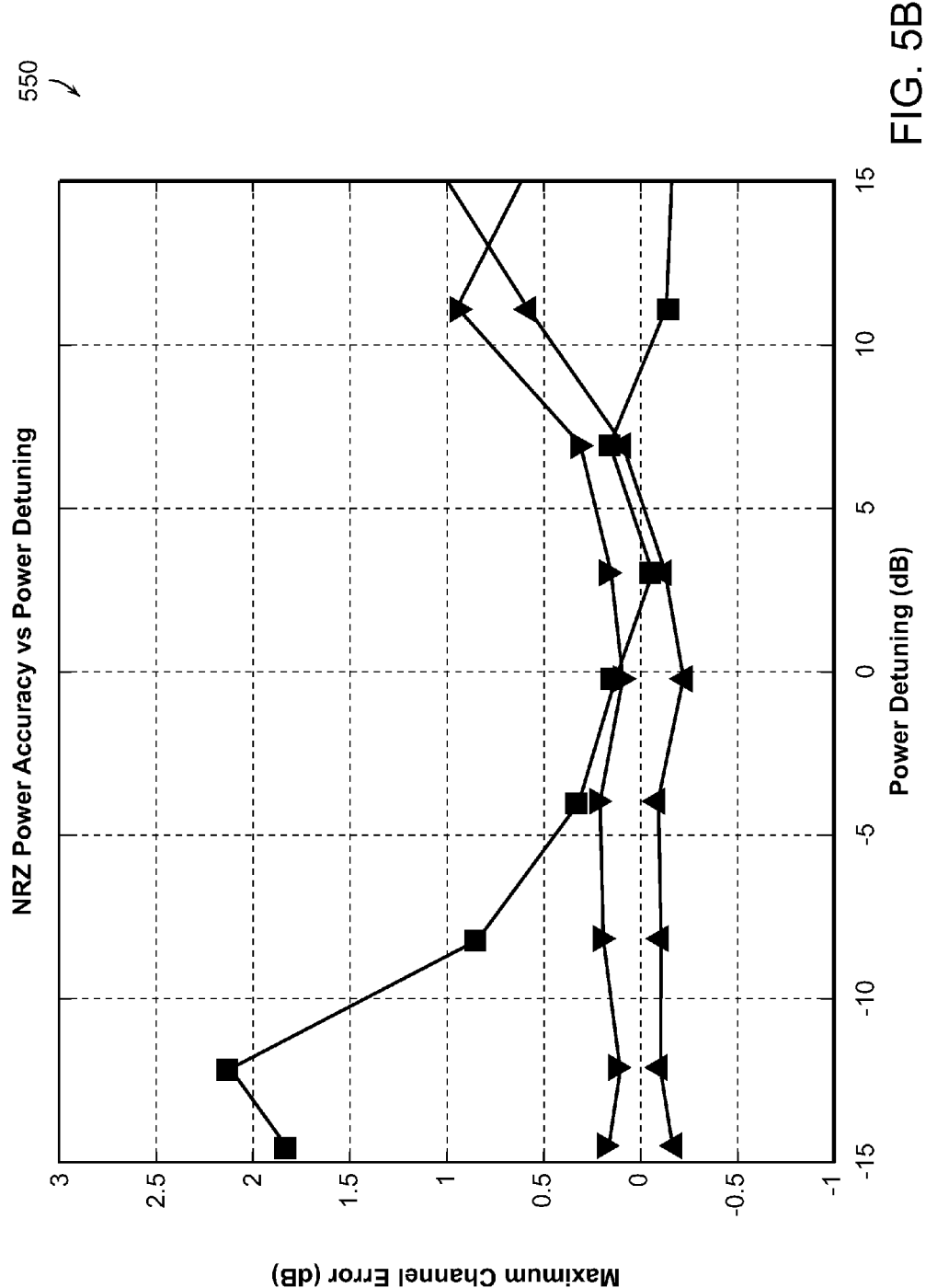
FIG. 5B illustrates experimental measurements for power accuracy as a function of power detuning.

FIGS. 5A and 5B illustrate data for power accuracy measurements. The algorithm accuracy was tested using an Aegis Lightwave, Inc. filter for a range of channel power detuning values. FIG. 5A illustrates a WDM input spectrum 500 that is used for power detuning during power accuracy measurements. The WDM input spectrum 500 includes a −8 dB signal 502 (V-shape, dotted), a 0 dB signal 504 (flat spectrum, solid) and a +8 dB signal 506 (A-shape, dashed).

FIG. 5B illustrates experimental measurements 550 for power accuracy as a function of power detuning. The experimental measurements 550 are presented for three 40 Gbps NRZ-DPSK signals that were spaced by 100 GHz. The experimental measurements are presented as maximum channel error in dB as a function of power detuning in dB. Experimental data are presented for positive power detuning. Positive power detuning is achieved by increasing the center channel power to create an "A-shape" signal. In addition, experimental data are presented for negative power detuning. Negative power detuning is achieved by decreasing the centre channel power to create a "V shape" signal.

The experimental data indicate that the power accuracy of the algorithm for all channels at the same power (i.e. 0 dB power detuning) is less than ±0.25 dB. The power accuracy of the low power channel for the V-shape signal degrades as the power detuning increases. In addition, the power accuracy of the low power channel for the A-shape signal degrades as the power detuning increases. This power accuracy degradation is due to the measurement accuracy of the peak power, $P_R$, and full-width, $FW_R$, of the low-power channel(s) in the presence of high-powered channels.

Figure 6:
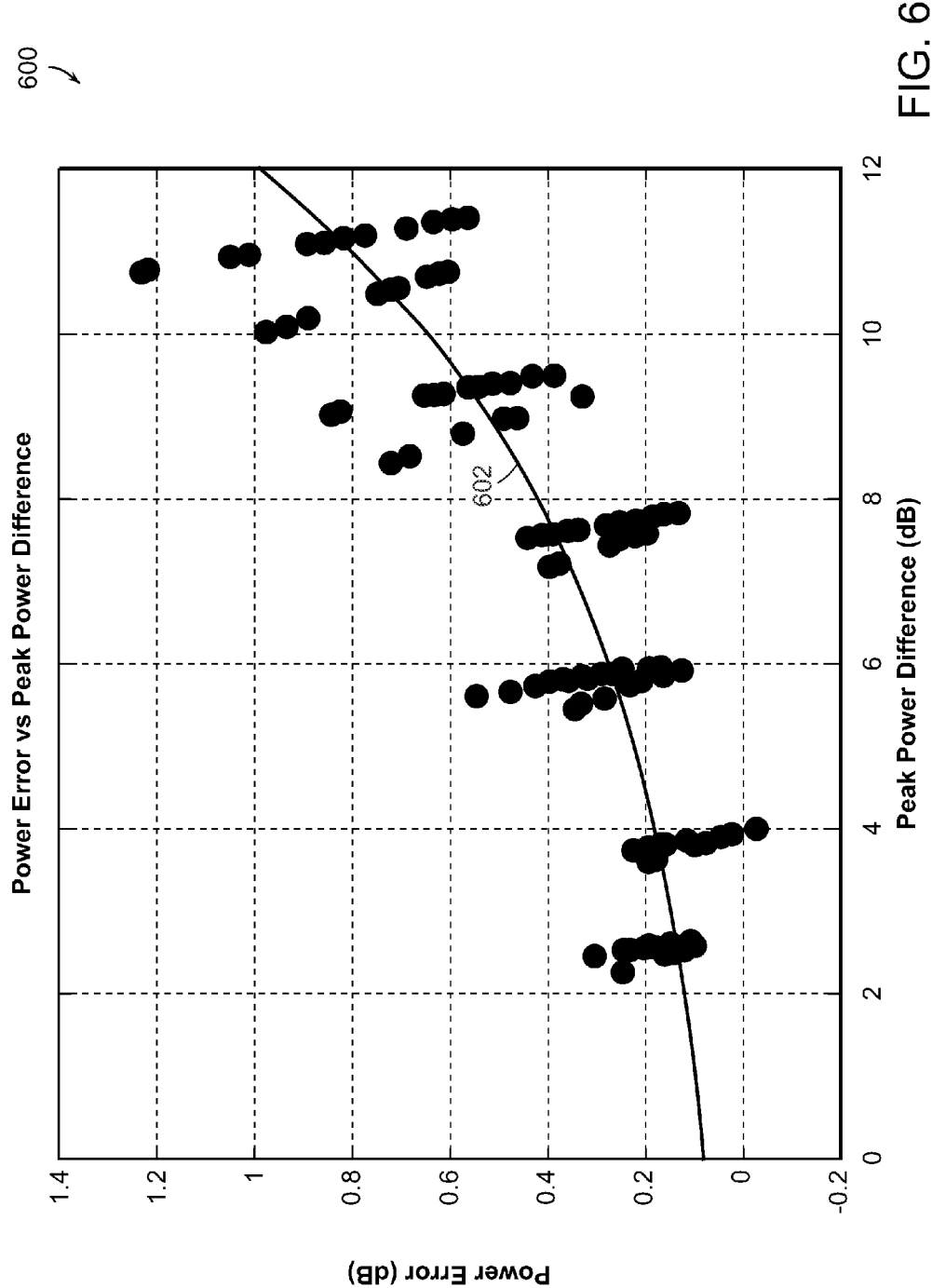
FIG. 6 illustrates experimental data for power error in dB as a function of peak power difference between adjacent channels in dB.

FIG. 6 illustrates experimental data 600 for power error in dB as a function of peak power difference between adjacent channels in dB. The peak power difference is also known as power detuning. Multiple channels with these peak power differences will increase the error. For example, two adjacent channels with the peak power differences indicated in the data 600 will double the power errors data 600.

The data 600 indicate that the performance of the channels when there is no power detuning is excellent. The power error is near zero, indicating that the measurement of the signal power is very accurate. However, as the power detuning between adjacent peaks increases, the power error rapidly increases. FIG. 6 shows a polynomial curve 602 that is fit to data 600.

Figure 7:
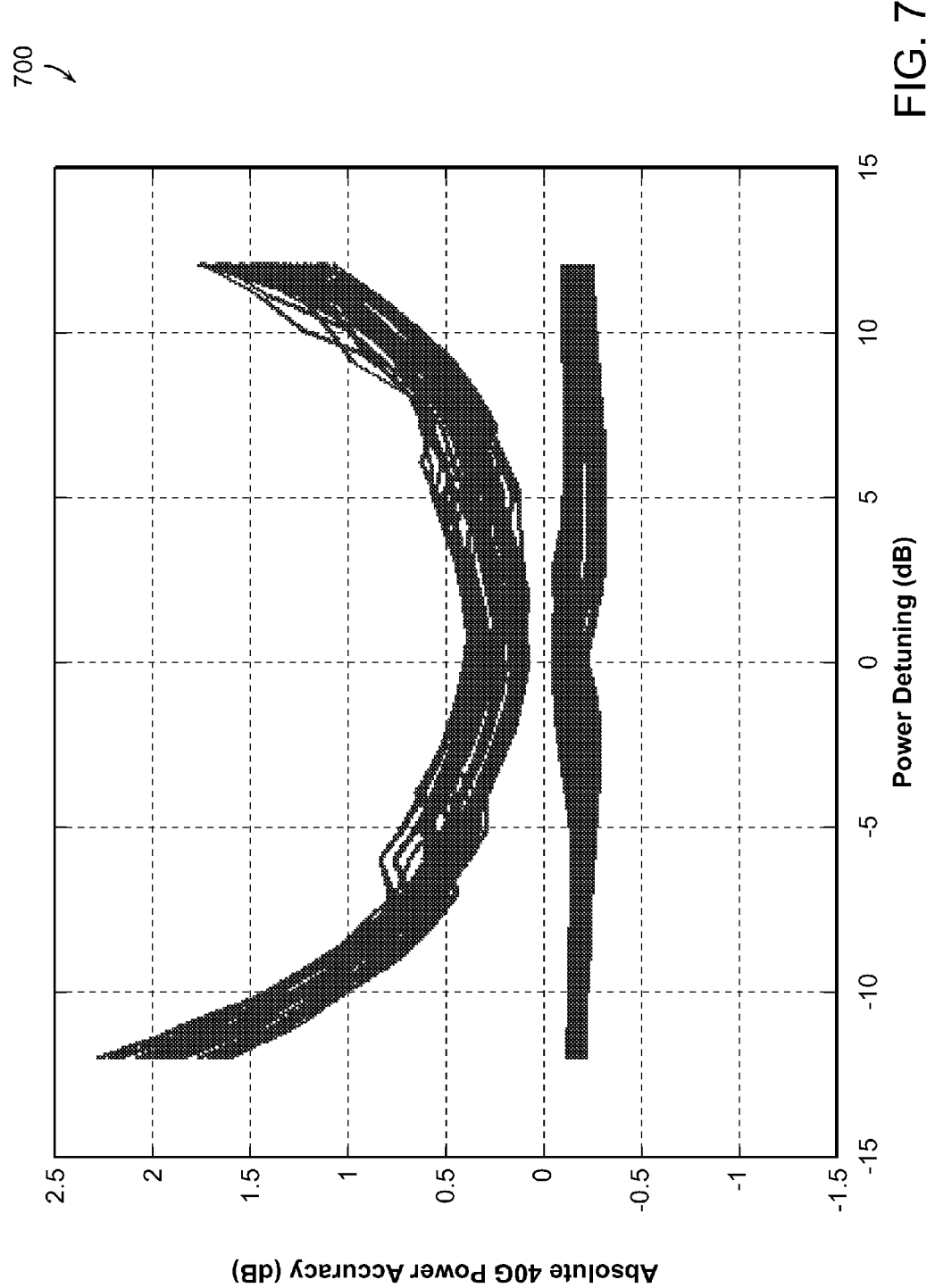
FIG. 7 illustrates a graph of absolute power accuracy in dB of a 40 Gbps signal as a function of peak power difference or power detuning in dB.

FIG. 7 illustrates a graph 700 of absolute power accuracy in dB of a 40 Gbps signal as a function of peak power difference or power detuning in dB. The graph 700 indicates that for both positive and negative detuning, there is a positive increase in the absolute power accuracy. In other words, if adjacent power peaks have lower or higher power, the result is that there is a positive error in the absolute power accuracy.

The polynomial curve 602 that is fit to the data 600 shown in FIG. 6 and the graph 700 that shows the absolute power accuracy as a function of power detuning in dB both indicate that power detuning produces a systematic power detuning error. This systematic power detuning error is reproducible and, therefore, optical power measurements can be compensated for power detuning by first determining the systematic power detuning error and then subtracting it from the measured power.

Figure 8:
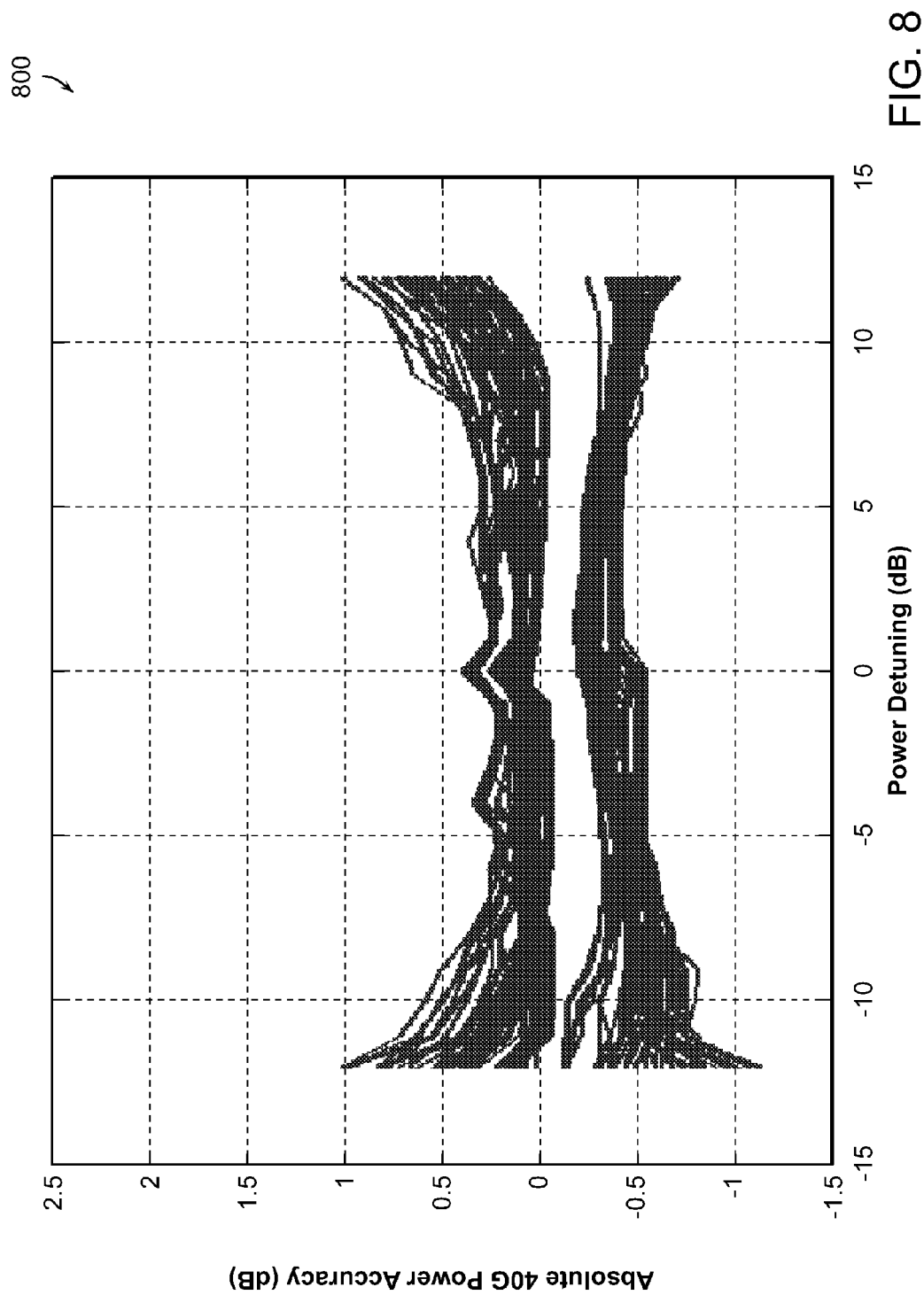
FIG. 8 illustrates a graph of absolute power accuracy in dB of a 40 Gbps signal compensated for systematic power detuning error as a function of peak power difference or power detuning in dB.

FIG. 8 illustrates a graph 800 of absolute power accuracy in dB of a 40 Gbps signal compensated for systematic power detuning error as a function of peak power difference or power detuning in dB. The data in the graph 800 was obtained by first determining the systematic power detuning error as described herein and then subtracting the systematic power detuning error from the absolute power accuracy. The data in graph 800 indicates that the absolute power accuracy can be greatly reduced by compensating for the systematic power detuning error.

EQUIVALENTS

While the present teachings are described in conjunction with various embodiments and examples, it is not intended that the present teachings be limited to such embodiments. On the contrary, the present teachings encompass various alternatives, modifications and equivalents, as will be appreciated by those of skill in the art, may be made therein without departing from the spirit and scope of the teaching.

What is claimed is:

1. A method for estimating optical power in an optical channel, the method comprising:
   a. determining a tunable filter full-width, $FW_F$, by measuring a frequency response of the tunable filter to a known signal;
   b. coupling a portion of an optical channel to an input of the tunable optical filter with an optical coupler;
   c. determining a peak power response, $P_R$, and a response full-width, $FW_R$, to the optical channel by measuring a response of the tunable filter to the optical channel and mapping the response to frequency; and
   d. calculating a signal power, $P_S$, from the peak power response, $P_R$, and a ratio of the response full-width, $FW_R$, to the tunable filter full-width, $FW_F$.

2. The method of claim 1 wherein the tunable filter full-width, $FW_F$, is determined by measuring a response of the tunable filter to an unmodulated signal and mapping the response to frequency.

3. The method of claim 2 wherein the unmodulated signal comprising a signal that estimates a delta function.

4. The method of claim 1 further comprising determining a power factor that calibrates the calculated signal power, $P_S$.

5. The method of claim 4 wherein the power factor relates the peak power response $P_R$ measurement to the response full-width, $FW_R$.

6. The method of claim 4 wherein the power factor is predetermined through experiments.

7. The method of claim 1 wherein the tunable filter full-width, $FW_F$, and the response full-width, $FW_R$, are measured at the same percentage down from their peak response.

8. The method of claim 1 wherein the calculating the signal power, $P_S$, comprises performing a deconvolution of the peak power response, $P_R$, with the ratio of the response full-width, $FW_R$, to the tunable filter full-width, $FW_F$.

9. The method of claim 1 further comprising changing a passband of the tunable optical filter and then determining a peak power response, $P_R$, and a full width tunable filter response, $FW_R$, by measuring the response of the tunable filter and mapping the response to frequency; and calculating a new signal power, $P_S$, from the peak power response, $P_R$, and a ratio of the response full-width, $FW_R$, to the tunable filter full-width, $FW_F$.

10. The method of claim 1 further comprising determining a systematic power detuning error and then compensating the signal power, $P_S$, for the systematic power detuning error.

11. An optical channel monitor comprising:
   a. an optical filter having an optical input that is coupled to an optical channel, the optical filter having a known filter full-width, $FW_F$, that passes a desired optical channel;
   b. a detector having an input that is optically coupled to an output of the optical filter, the detector generating an electrical signal proportional to a peak power response, $P_R$, and a response full-width, $FW_R$, of the desired optical channel; and
   c. an electronic processor having an input that is coupled to the output of the detector, the processor calculating a signal power, $P_S$, from the peak power response, $P_R$, and a ratio of the full width filter response, $FW_R$, to the filter full-width, $FW_F$.

12. The optical channel monitor of claim 11 wherein the optical filter has an approximate Gaussian filter response.

13. The optical channel monitor of claim 11 wherein the processor stores calibration data for a power factor that relates the peak power response $P_R$ measurement to the response full-width, $FW_R$.

14. The optical channel monitor of claim 11 wherein the processor stores calibration data for the filter response, $FW_F$.

15. The optical channel monitor of claim 11 further comprising a network management system that is electrically coupled to the processor, the network management system receiving signal power, $P_S$, data from the processor.

16. An optical channel monitor comprising:
   a. a tunable optical filter having an optical input that is coupled to an optical channel and an electrical control input, the tunable optical filter having a known filter full-width, $FW_F$, that passes a desired optical channel;
   b. a detector having an input that is optically coupled to an output of the tunable optical filter, the detector generating an electrical signal proportional to a peak power response, $P_R$, and a response full-width, $FW_R$, of the desired optical channel; and
   c. an electronic processor having an input that is coupled to the output of the detector and an output that is coupled to the electrical control input of the a tunable optical filter, the processor calculating a signal power, $P_S$, from the peak power response, $P_R$, and a ratio of the response full-width, $FW_R$, to the filter full-width, $FW_F$, and generating a signal at the output that instructs the tunable optical filter to pass a desired optical channel.

17. The optical channel monitor of claim 16 wherein the tunable optical filter comprises an electrically controllable thermally tunable optical filter.

18. The optical channel monitor of claim 16 wherein the processor stores calibration data for a power factor that relates the peak power response $P_R$ measurement to the response full-width, $FW_R$.

19. The optical channel monitor of claim 16 wherein the processor stores calibration data for the filter response, $FW_F$.

20. The optical channel monitor of claim 16 further comprising a network management system that is electrically coupled to the processor, the network management system receiving signal power, $P_S$, data from the processor and generating instructions for the processor to select desired optical channels.

* * * * *